(12) United States Patent
Sugawara et al.

(10) Patent No.: US 10,365,124 B2
(45) Date of Patent: Jul. 30, 2019

(54) ELECTROMAGNETIC ACTUATOR

(71) Applicant: MITSUBISHI ELECTRIC CORPORATION, Tokyo (JP)

(72) Inventors: Masafumi Sugawara, Tokyo (JP); Toru Ogawa, Tokyo (JP); Hideaki Arita, Tokyo (JP); Shoji Ishikawa, Tokyo (JP); Hitoshi Yoshizumi, Tokyo (JP); Satoshi Tesen, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 66 days.

(21) Appl. No.: 15/579,096

(22) PCT Filed: Jun. 4, 2015

(86) PCT No.: PCT/JP2015/066233
§ 371 (c)(1),
(2) Date: Dec. 1, 2017

(87) PCT Pub. No.: WO2016/194207
PCT Pub. Date: Dec. 8, 2016

(65) Prior Publication Data
US 2018/0172478 A1    Jun. 21, 2018

(51) Int. Cl.
*G01D 5/20*    (2006.01)
*G01B 7/00*    (2006.01)
(Continued)

(52) U.S. Cl.
CPC ........ *G01D 5/2006* (2013.01); *F01L 13/0036* (2013.01); *G01B 7/00* (2013.01);
(Continued)

(58) Field of Classification Search
CPC .......... G01D 5/145; G01B 7/04; H01F 7/1607
See application file for complete search history.

(56) References Cited

U.S. PATENT DOCUMENTS

| 5,032,812 A | 7/1991 | Banick et al. |
| 6,213,147 B1 * | 4/2001 | Gramann ................. F01L 9/04 |
| | | 123/90.11 |

(Continued)

FOREIGN PATENT DOCUMENTS

| JP | 7-94322 A | 4/1995 |
| JP | 2001-155921 A | 6/2001 |
| JP | 2003-336509 A | 11/2003 |

OTHER PUBLICATIONS

International Search Report for PCT/JP2015/066233 (PCT/ISA/210) dated Aug. 18, 2015.

*Primary Examiner* — Jermele M Hollington
*Assistant Examiner* — Alvaro E Fortich
(74) *Attorney, Agent, or Firm* — Birch, Stewart, Kolasch & Birch, LLP

(57) ABSTRACT

An electromagnetic actuator (1) includes sensor magnets (21a, 21b) disposed correspondingly to plungers (11a, 11b), respectively. The electromagnetic actuator (1) further includes a sensor core (22) made of a magnetic material and disposed in a position through which magnetic fluxes from the plurality of sensor magnets (21a, 21b) can flow, and a magnetic sensor (23) that is disposed in a part of the sensor core (22) through which the magnetic fluxes of the plurality of sensor magnets (21a, 21b) can flow in common, and that detects the magnetic flux, which varies in accordance with respective positions of the plurality of plungers (11a, 11b).

14 Claims, 10 Drawing Sheets

(51) Int. Cl.
*F01L 13/00* (2006.01)
*G01B 7/04* (2006.01)
*H01F 7/16* (2006.01)
*G01D 5/14* (2006.01)

(52) U.S. Cl.
CPC ............... *G01B 7/04* (2013.01); *G01D 5/145* (2013.01); *H01F 7/1607* (2013.01); *F01L 2013/0052* (2013.01); *F01L 2013/101* (2013.01); *F01L 2013/11* (2013.01); *F01L 2101/00* (2013.01)

(56) References Cited

U.S. PATENT DOCUMENTS

| | | | |
|---|---|---|---|
| 2012/0031360 A1 | 2/2012 | Laufenberg et al. | |
| 2015/0152964 A1* | 6/2015 | Tanaka | F16H 61/26 74/473.16 |
| 2016/0071640 A1* | 3/2016 | Kato | F02D 13/0207 335/229 |

* cited by examiner

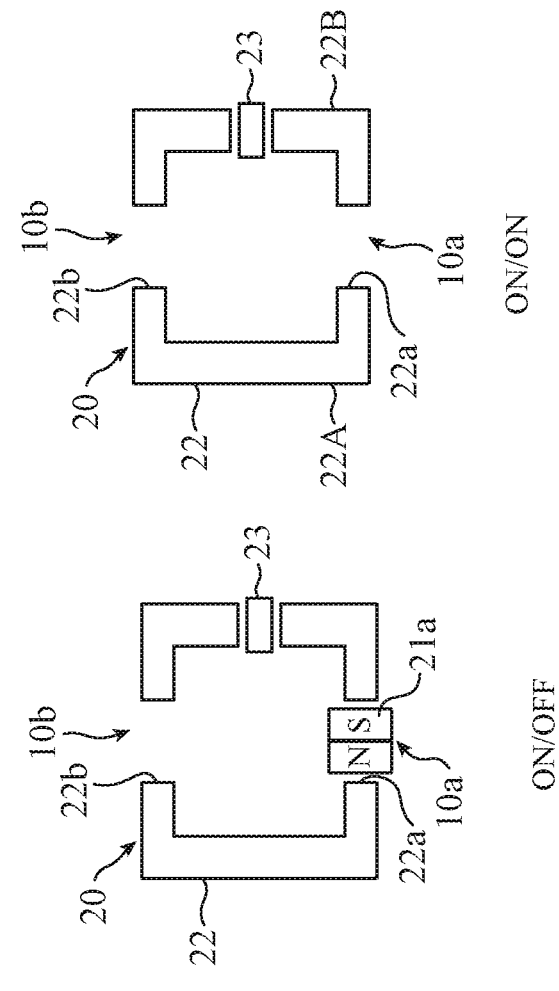

OFF/OFF

ON/OFF

ON/ON

OFF/OFF

ON/OFF

ON/ON

ELECTROMAGNETIC ACTUATOR

TECHNICAL FIELD

The present invention relates to an electromagnetic actuator capable of detecting a position of a plunger serving as a mover.

BACKGROUND ART

There is an actuator which has a function to detect a position of a mover (see Patent Literature 1, for example). The electromagnetic actuator described in Patent Literature 1 is constituted by a coil serving as a magnetomotive force generation source, a yoke serving as a magnetic path, a core serving as the mover, a plug nut that can be engaged to the core, a spring that pushes the core toward a position away from the plug nut, a large magnet and a small magnet that generate magnetic fluxes in the yoke in mutually opposite directions, and a magnetic sensor that detects the direction of the magnetic flux flowing through the yoke.

In an initial state, the core is biased by the spring so as to be held in an initial position away from the plug nut. In this initial state, in the magnetic flux flowing through the yoke in the vicinity of the magnetic sensor, the magnetic flux from the large magnet is dominant, and therefore the magnetic sensor detects the direction of the magnetic flux from the large magnet.

When the core is moved from the initial state by the magnetomotive force of the coil so as to be engaged with the plug nut, the magnetic flux from the large magnet flows through the plug nut and the core while bypassing the yoke in the vicinity of the magnetic sensor. In this state, in the magnetic flux flowing through the yoke in the vicinity of the magnetic sensor, the magnetic flux from the small magnet is dominant, and therefore the magnetic sensor detects the direction of the magnetic flux from the small magnet.

The large magnet and the small magnet are disposed so as to generate magnetic fluxes in mutually opposite directions, and therefore the position of the core relative to the plug nut is recognized by detecting variation in the direction of the magnetic flux flowing through the yoke using the magnetic sensor.

CITATION LIST

Patent Literature

Patent Literature 1: Japanese Patent Application Publication No. H07-94322 (1995-94322)

SUMMARY OF INVENTION

Technical Problem

In Patent Literature 1, two magnets are required to detect the position of a single mover, and therefore the structure is complicated. Further, an electromagnetic actuator having a plurality of movers is not considered, and therefore a problem arises in that positions of a plurality of movers cannot be detected using a single magnetic sensor.

An electromagnetic actuator may be used in an internal combustion engine, for example, to switch a camshaft between high cam and low cam in order to adjust a lift amount of an intake valve or an exhaust valve. This type of electromagnetic actuator is configured to include two movers and operate two shafts, and a switch from high cam to low cam is performed by operating one of the shafts, and a switch from low cam to high cam is performed by operating the other shaft. When the position detection function of Patent Literature 1 is applied to this type of electromagnetic actuator having two movers, two sets of magnets and two magnetic sensors are required to detect the respective positions of the two movers.

The present invention is designed to solve the problem described above, and an object thereof is to detect respective positions of a plurality of movers provided in an electromagnetic actuator using a single magnetic sensor.

Solution to Problem

An electromagnetic actuator according to the present invention includes a plurality of sets, each of the sets including: a plunger made of a magnetic material; a spring biasing the plunger in one direction; a core made of a magnetic material; and a coil generating, in the core, a magnetic flux to move the plunger in an opposite direction to the one direction. The electromagnetic actuator further includes: a plurality of sensor magnets disposed correspondingly to a plurality of plungers, respectively, each of the plurality of plungers being the plunger in each of the plurality of sets; a sensor core made of a magnetic material and disposed in a position through which a magnetic flux from the plurality of sensor magnets can flow; and a magnetic sensor that is disposed in a part of the sensor core through which respective magnetic fluxes of the plurality of sensor magnets can flow in common, and that detects a magnetic flux, which varies in accordance with respective movement positions of the plurality of plungers.

Advantageous Effects of Invention

According to the present invention, a magnetic sensor disposed in a part of a sensor core through which magnetic fluxes of a plurality of sensor magnets can flow in common detects the magnetic flux which varies in accordance with movement positions of plurality of plungers and therefore the respective positions of the plurality of plungers can be detected using the single magnetic sensor.

BRIEF DESCRIPTION OF DRAWINGS

FIGS. 4A to 4C are plan views schematically illustrating operating states of two solenoid units in the electromagnetic actuator according to Embodiment 2;

DESCRIPTION OF EMBODIMENTS

To describe the present invention in more detail, some embodiments of the invention will be described below with reference to the accompanying drawings.

Embodiment 1

Figure 1A:
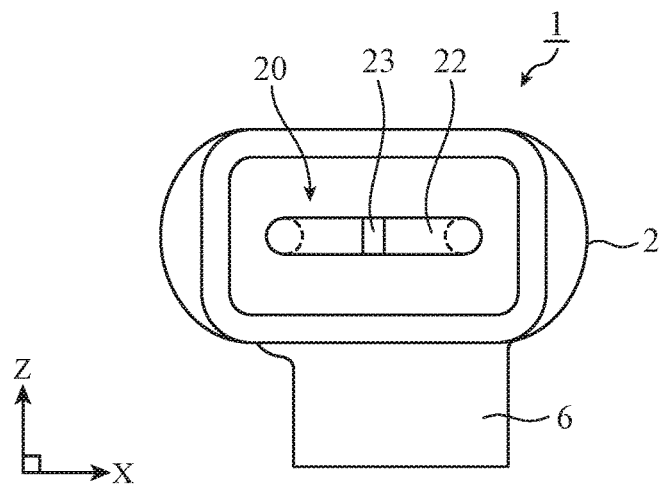
FIGS. 1A and 1B show an example configuration of an electromagnetic actuator according to Embodiment 1 of the invention, FIG. 1A being a plan view and FIG. 1B being a sectional view.
Figure 1B:
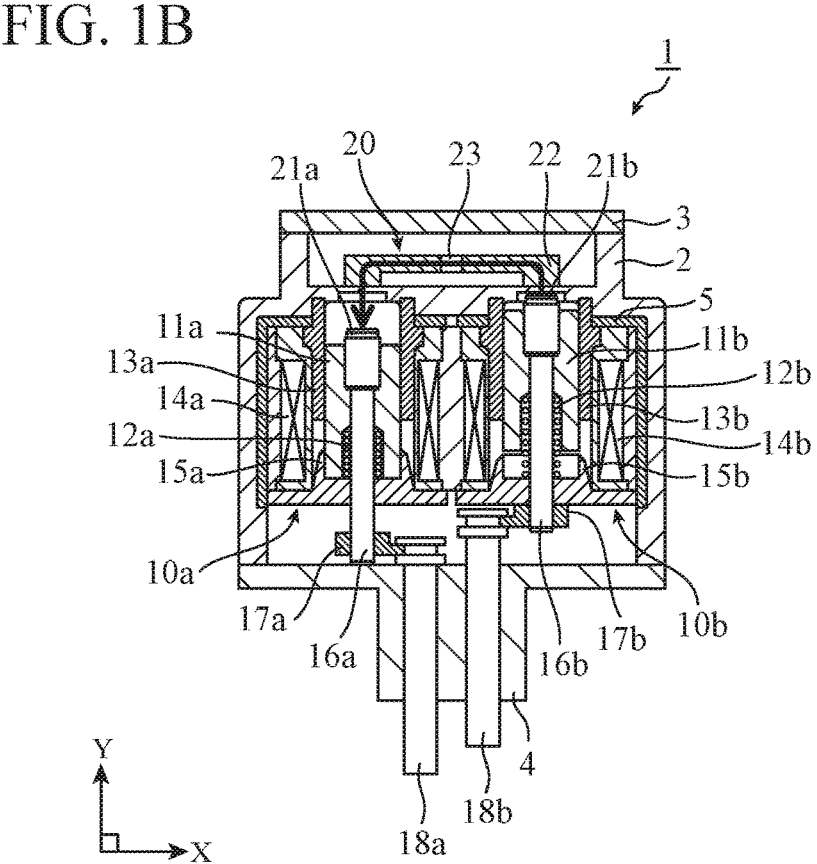

FIGS. 1A and 1B show an example configuration of an electromagnetic actuator 1 according to Embodiment 1 of the present invention. FIG. 1A is a plan view and FIG. 1B is a sectional view. Note that in FIG. 1A, a case 3 is removed so that a position detection unit 20 is exposed.

In FIGS. 1A, 1B and respective figures to be described later, the direction in which two solenoid units 10a, 10b are aligned is defined as the X axis direction, the direction in which plungers 11a, 11b move is defined as the Y axis direction, and the direction that is orthogonal to the X axis direction and the Y axis direction is defined as the Z axis direction. Further, a side of the electromagnetic actuator 1 on which cores 13a, 13b are disposed is referred to as an upper side, and a side of the electromagnetic actuator 1 on which bosses 15a, 15b are disposed is referred to as a lower side.

The electromagnetic actuator 1 is housed in the interior of cases 2, 3, 4 made of resin or the like. The electromagnetic actuator 1 includes the two solenoid units 10a, 10b.

The solenoid unit 10a includes a plunger 11a, which is made of a magnetic material, a spring 12a that biases the plunger 11a toward the upper side in the Y axis direction, the core 13a, which is made of a magnetic material, and a coil 14a that generates, in the core 13a, a magnetic flux for moving the plunger 11a toward the lower side in the Y axis direction, i.e. in an opposite direction to the biasing direction of the spring 12a.

A yoke 5 made of a magnetic material is embedded in the case 2. Further, the coil 14a is fixed to the interior of the case 2. The plunger 11a is slidably held by the tubular core 13a and the boss 15a, which are disposed on an inner side of the coil 14a. A magnetic circuit of the solenoid unit 10a is constituted by the coil 14a, which serves as a magnetomotive force source, the core 13a, the boss 15a, and the yoke 5, which serve as a magnetic path. The core 13a, the boss 15a, the yoke 5, and the coil 14a are stators.

The plunger 11a serving as a mover is formed in a tubular shape, and the spring 12a and a pin 16a are disposed in the interior thereof. A shaft 18a is attached to a lower end portion of the pin 16a via a link 17a. A sensor magnet 21a is disposed on an upper end face of the plunger 11a. When the plunger 11a moves up and down, the sensor magnet 21a, the pin 16a, the link 17a, and the shaft 18a also move up and down.

When the coil 14a is energized via a terminal led out to a connector 6, a magnetic flux is generated in the core 13a, and the generated magnetic flux flows along a path formed by the core 13a, the plunger 11a, the boss 15a, the yoke 5, and the core 13a. At this time, a magnetic flux flows through an air gap between the plunger 11a and the boss 15a such that electromagnetic force oriented downward in the Y axis direction is generated in the plunger 11a. The plunger 11a moves toward the lower side in the Y axis direction against the biasing force of the spring 12a by this electromagnetic force. When the coil 14a becomes a non-energized state, the plunger 11a moves toward the upper side in the Y axis direction by the biasing force of the spring 12a.

The solenoid unit 10b is configured similarly to the solenoid unit 10a so as to include the plunger 11b, a spring 12b, the core 13b, and a coil 14b. Further, a sensor magnet 21b and a pin 16b are attached to the plunger 11b such that when the plunger 11b moves up and down, the sensor magnet 21b, the pin 16b, and a shaft 18b attached to the pin 16b via a link 17b also move up and down.

On an upper face of the case 2, a sensor core 22 made of a magnetic material through which the magnetic flux of the sensor magnets 21a, 21b can flow in common and a magnetic sensor 23 that detects the magnetic flux flowing through the sensor core 22 are disposed. The magnetic sensor 23 is interposed in an air gap formed midway in the sensor core 22. The sensor magnets 21a, 21b are disposed so as to generate magnetic fluxes in mutually opposite directions. For example, when an upper face of the sensor magnet 21a facing the sensor core 22 side is the S pole, a lower face of the sensor magnet 21a facing the pin 16a side is the N pole, an upper face of the sensor magnet 21b facing the sensor core 22 side is the N pole, and a lower face of the sensor magnet 21b facing the pin 16b side is the S pole, the magnetic flux of the sensor magnets 21a, 21b flowing through the sensor core 22 is oriented as indicated by the arrow in FIG. 1B.

The sensor magnets 21a, 21b, the sensor core 22, and the magnetic sensor 23 constitute a position detection unit 20 for detecting respective positions of the plungers 11a, 11b. The position detection unit 20 according to Embodiment 1 is configured such that the sensor core 22 and the magnetic sensor 23 are disposed to be aligned on the XY plane that is parallel to a movement direction of the plungers 11a, 11b, and such that the magnetic fluxes of the sensor magnets 21a, 21b flows on the XY plane.

Next, a method of detecting the positions of the two plungers 11a, 11b using the single magnetic sensor 23 will be described.

In the electromagnetic actuator 1, four operating states, namely (OFF/OFF), (ON/OFF), (OFF/ON), and (ON/ON), exist correspondingly to the combinations of the ON state and the OFF state of each of the two solenoid units 10a, 10b. Note that, in Embodiment 1, the (ON/OFF) and the (OFF/ON) are taken as a single operating state, without differentiating therebetween.

When a solenoid unit is in the OFF state, the plunger of the solenoid unit receives the biasing force of the spring so as to move to the upper side in the Y axis direction.

Conversely, when the solenoid unit is in the ON state, the plunger of the solenoid unit receives the electromagnetic force of the stators so as to move to the lower side in the Y axis direction. In FIGS. 1A and 1B, the solenoid unit 10a is in the ON state and the solenoid unit 10b is in the OFF state.

The magnetic sensor 23 detects the respective positions of the plungers 11a, 11b by detecting variation in a magnetic flux density of the sensor core 22, in which the sensor magnets 21a, 21b that move integrally with the plungers 11a, 11b serve as a magnetomotive force sources. A magnetic circuit of the position detection unit 20 is constituted by the sensor magnets 21a, 21b serving as the magnetomotive force sources, the sensor core 22, the plungers 11a, 11b, the cores 13a, 13b, the bosses 15a, 15b, and the yoke 5, which serve as a magnetic path. Among these elements, the bosses 15a, 15b can be omitted.

Figure 2:
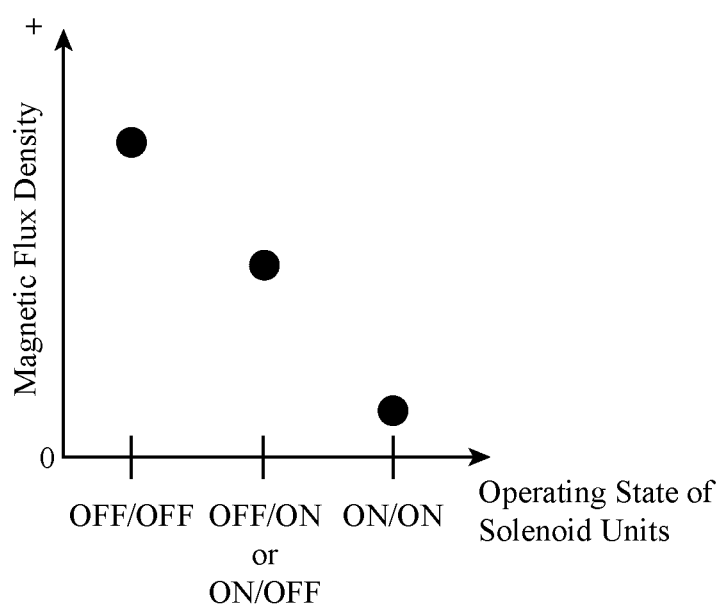
FIG. 2 is a graph schematically illustrating a relationship between operating states of two solenoid units and a magnetic flux density detected by a magnetic sensor in the electromagnetic actuator according to Embodiment 1.

FIG. 2 is a graph schematically illustrating a relationship between the operating states of the solenoid units 10a, 10b and the magnetic flux density detected by the magnetic sensor 23.

When the solenoid units 10a, 10b are both in the OFF states and so that the plungers 11a, 11b are both positioned on the upper side in the Y axis direction, respective air gaps between the sensor magnets 21a, 21b and the sensor core 22 are small, and therefore the magnetic resistance in the magnetic circuit of the position detection unit 20 is small. As a result, the magnetic flux density passing through the magnetic sensor 23 is large.

When the solenoid units 10a, 10b are both in the ON states so that the plungers 11a, 11b are both positioned on the lower side in the Y axis direction, the respective air gaps between the sensor magnets 21a, 21b and the sensor core 22 become large, and the magnetic resistance in the magnetic circuit of the position detection unit 20 becomes large. As a result, the magnetic flux density passing through the magnetic sensor 23 becomes small.

When one of the solenoid units 10a, 10b is in the ON state and the other is in the OFF state so that one of the plungers 11a, 11b is positioned on the lower side in the Y axis direction and the other is positioned on the upper side in the Y axis direction, the magnetic resistance in the magnetic circuit of the position detection unit 20 takes an intermediate value, and as a result, the magnetic flux density passing through the magnetic sensor 23 also takes an intermediate value.

By performing determination of three levels of magnetic flux density detected by the magnetic sensor 23, namely large, small, and intermediate, based on threshold values, for example, it can be determined that the plungers 11a, 11b are both on the upper side in the Y axis direction when the magnetic flux density is at the large level, that one of the plungers 11a, 11b is on the lower side in the Y axis direction and the other is on the upper side in the Y axis direction when the magnetic flux density is at the intermediate level, and that the plungers 11a, 11b are both on the lower side in the Y axis direction when the magnetic flux density is at the small level.

Conventionally, as illustrated in Patent Literature 1, for example, two magnetic sensors are required to detect the positions of the two plungers 11a, 11b, and therefore terminals for two magnetic sensors are required to be provided in the connector 6. In Embodiment 1, on the other hand, the positions of the two plungers 11a, 11b can be detected by a single magnetic sensor 23, and therefore the number of terminals provided in the connector 6 can be reduced by one in accordance with the reduction of one magnetic sensor. Furthermore, conventionally, two sets of magnets, each set includes a large magnet and a small magnet, are required to detect the positions of the two plungers 11a, 11b, whereas in Embodiment 1, the same number of sensor magnets 21a, 21b as the plungers is sufficient to detect them. As a result, the configuration for position detecting can be simplified.

Note that in Embodiment 1, when only one of the solenoid units 10a, 10b is in the ON state, or in other words when the state is (ON/OFF) or (OFF/ON), the individual positions of the plungers 11a, 11b cannot be determined on the basis of the magnetic flux density detected by the magnetic sensor 23. However, even in such cases, by detecting which of the coils 14a, 14b is energized, the individual positions of the plungers 11a, 11b can be determined.

According to Embodiment 1, as described above, the electromagnetic actuator 1 is configured to have the sensor magnets 21a, 21b correspondingly disposed to the plungers 11a, 11b, respectively, the sensor core 22, which is made of a magnetic material and disposed in a position through which the magnetic flux of each of the plurality of sensor magnets 21a, 21b can flow, and the magnetic sensor 23 that is disposed in a part of the sensor core 22 through which the magnetic fluxes of the plurality of sensor magnets 21a, 21b can flow in common, and that detects the magnetic flux, which varies in accordance with the respective movement positions of the plurality of plungers 11a, 11b. As a result, the positions of the plurality of plungers 11a, 11b can be detected using the single magnetic sensor 23.

Embodiment 2

Figure 3A:
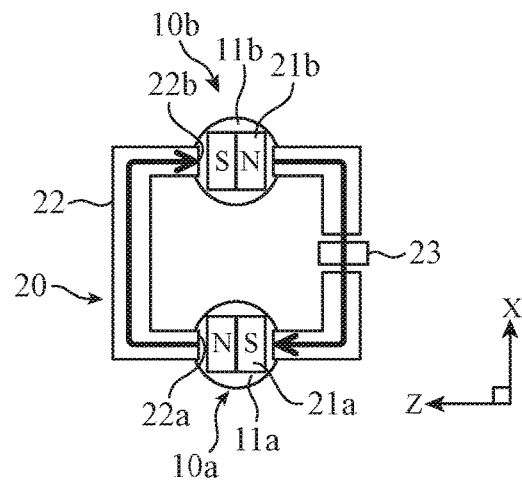
FIGS. 3A to 3C show an example configuration of a position detection unit of an electromagnetic actuator according to Embodiment 2 of the invention, FIG. 3A being a plan view and FIGS. 3B and 3C being front views.
Figure 3B:
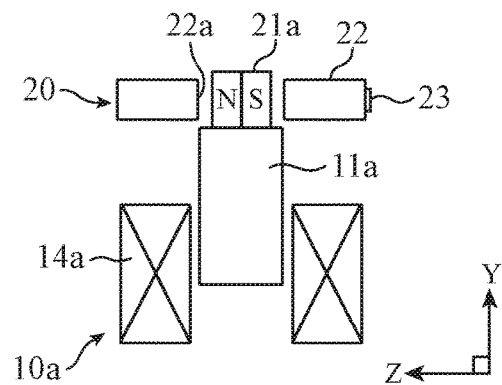
Figure 3C:
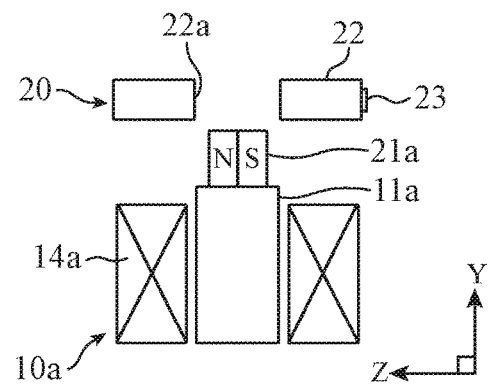

FIGS. 3A to 3C show an example configuration of a position detection unit 20 of an electromagnetic actuator 1 according to Embodiment 2 of the present invention. FIG. 3A is a plan view, FIG. 3B is a front view showing the solenoid unit 10a in the OFF state, and FIG. 3C is a front view showing the solenoid unit 10a in the ON state. Parts of the electromagnetic actuator 1 according to Embodiment 2 that are omitted in FIGS. 3A to 3C are configured identically to the electromagnetic actuator 1 according to Embodiment 1, shown in FIGS. 1A and 1B, and therefore FIGS. 1A and 1B should be referred to for these parts.

As shown in FIG. 3A, the position detection unit 20 according to Embodiment 2 is configured such that the sensor core 22 and the magnetic sensor 23 are disposed to be aligned on the XZ plane that is perpendicular to the movement direction of the plungers 11a, 11b, and such that the magnetic fluxes of the sensor magnets 21a, 21b flow on the XZ plane. The magnetic fluxes flowing through the sensor core 22 from the sensor magnets 21a, 21b are oriented as indicated by arrows in FIG. 3A.

Further, an air gap portion 22a in which the sensor magnet 21a is inserted and an air gap portion 22b in which the sensor magnet 21b is inserted are formed in the sensor core 22. The sensor magnet 21a moves integrally with the plunger 11a so as to be inserted to the air gap portion 22a. The sensor magnet 21b moves integrally with the plunger 11b so as to be inserted to the air gap portion 22b.

As shown in FIG. 3B, when the solenoid unit 10a is in the OFF state, the plunger 11a of the solenoid unit 10a receives the biasing force of the spring 12a so as to move to the upper side in the Y axis direction. At this time, the sensor magnet 21a is inserted to the air gap portion 22a so as to be positioned in the magnetic circuit of the position detection unit 20. Accordingly, the sensor magnet 21a serves as a magnetomotive force source of the magnetic circuit of the position detection unit 20 so that a magnetic flux flows through the sensor core 22.

As shown in FIG. 3C, when the solenoid unit 10a is in the ON state, the plunger 11a of the solenoid unit 10a receives the electromagnetic force of the stators so as to move to the lower side in the Y axis direction. At this time, the sensor magnet 21a exits the air gap portion 22a so as to be positioned outside the magnetic circuit of the position detection unit 20. Accordingly, the sensor magnet 21a does not serve as a magnetomotive force source of the magnetic circuit of the position detection unit 20, and therefore the amount of the magnetic flux flowing through the sensor core 22 decreases.

Although not shown in the figures, the solenoid unit 10b is configured similarly to the solenoid unit 10a such that when the solenoid unit 10b is in the OFF state, the sensor magnet 21b is inserted to the air gap portion 22b so as to serve as a magnetomotive force source of the magnetic circuit of the position detection unit 20. Conversely, when the solenoid unit 10b is in the ON state, the sensor magnet 21b exits the air gap portion 22b, and therefore does not serve as a magnetomotive force source of the magnetic circuit of the position detection unit 20.

In Embodiment 2, the density of the magnetic flux flowing through the sensor core 22 in which the magnetic sensor 23 is disposed varies in accordance with whether or not the sensor magnets 21a, 21b serve as magnetomotive force sources on the magnetic circuit of the position detection unit 20. Therefore, by detecting variation in the magnetic flux density with the magnetic sensor 23, the positions of the plungers 11a, 11b can be detected.

FIGS. 4A to 4C are views schematically illustrating the operating states of the solenoid units 10a, 10b.

As shown in FIG. 4A, when the solenoid units 10a, 10b are both in the OFF states such that the sensor magnets 21a, 21b are both positioned within the respective air gap portions 22a, 22b of the sensor core 22, the magnetic flux density passing through the magnetic sensor 23 is large.

As shown in FIG. 4C, when the solenoid units 10a, 10b are both in the ON states such that the sensor magnets 21a, 21b are not positioned within the respective air gap portions 22a, 22b of the sensor core 22, the magnetic flux density passing through the magnetic sensor 23 is small.

As shown in FIG. 4B, when one of the solenoid units 10a, 10b is in the ON state and the other is in the OFF state such that one of the sensor magnets 21a, 21b is in the corresponding air gap portions 22a, 22b of the sensor core 22 and the other is not in the corresponding air gap portions 22a, 22b, the magnetic flux density passing through the magnetic sensor 23 takes an intermediate value.

Note that in Embodiment 2, similarly to Embodiment 1 described above, when only one of the solenoid units 10a, 10b is in the ON state, the individual positions of the plungers 11a, 11b can be determined by detecting which of the coils 14a, 14b is energized.

In the electromagnetic actuator 1, the magnetic circuits of the solenoid units 10a, 10b having the coils 14a, 14b as magnetomotive force sources and the magnetic circuit of the position detection unit 20 having the sensor magnets 21a, 21b as magnetomotive force sources exist. The magnetic circuit of the position detection unit 20 is a separate circuit to the magnetic circuits of the solenoid units 10a, 10b, but is influenced by the magnetic flux that flows through the solenoid units 10a, 10b when the coils are energized.

Here, as shown in FIG. 4C, the sensor core 22 is divided into divided cores at the air gap portions 22a, 22b and referred to as divided cores 22A, 22B. In the divided core 22A, the magnetic resistance is small, and therefore the magnetic flux generated during coil energization mainly flows through the divided core 22A. In the divided core 22B, on the other hand, the position where the magnetic sensor 23 is disposed is an air gap, and as a result, the magnetic resistance is larger than that of the divided core 22A, and the magnetic flux is hard to flow during coil energization. Accordingly, the influence of the magnetic flux generated during coil energization on the magnetic sensor 23 can be reduced.

According to Embodiment 2, as described above, the positions of the plurality of plungers 11a, 11b can be detected using the single magnetic sensor 23 also in a case where the sensor core 22 and the magnetic sensor 23 are disposed to be aligned on the XZ plane that is perpendicular to the movement direction of the plungers 11a, 11b.

Figure 5A:
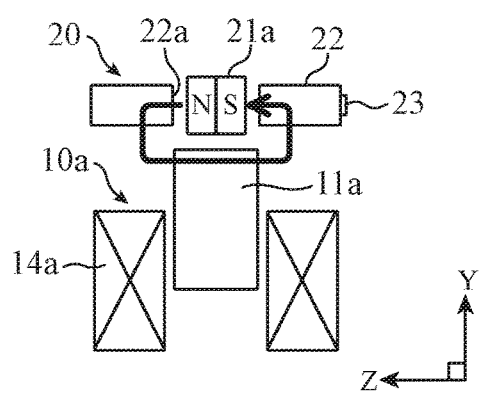
FIGS. 5A and 5B are plan views showing a modified example of the position detection unit of the electromagnetic actuator according to Embodiment 2.
Figure 5B:
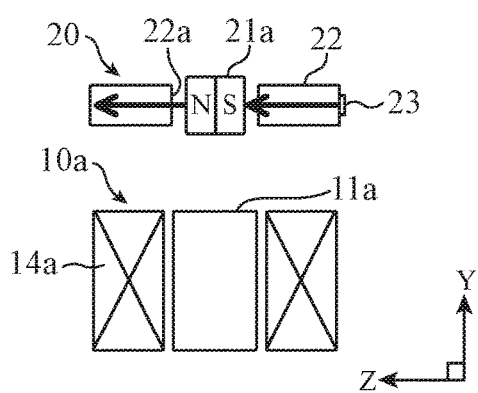

Note that in Embodiment 2, the sensor magnets 21a, 21b are fixed to the plungers 11a, 11b, but may be fixed to a position on the XZ plane that is perpendicular to the movement direction of the plungers 11a, 11b. FIGS. 5A and 5B show this modified example.

FIGS. 5A and 5B are front views showing a modified example of the position detection unit 20 of the electromagnetic actuator 1 according to Embodiment 2. The air gap portion 22a is formed in the sensor core 22 disposed on the XZ plane, and the sensor magnet 21a is inserted to and fixed to the air gap portion 22a.

When the solenoid unit 10a is in the OFF state, as shown in FIG. 5A, the plunger 11a moves toward the upper side in the Y axis direction so as to approach the sensor magnet 21a fixed to the sensor core 22, and therefore the magnetic flux of the sensor magnet 21a flows to the plunger 11a. As a result, the magnetic flux density detected by the magnetic sensor 23 becomes small.

When the solenoid unit 10a is in the ON state, as shown in FIG. 5B, the plunger 11a moves toward the lower side in the Y axis direction so as to move away from the sensor magnet 21a fixed to the sensor core 22, and therefore the magnetic flux of the sensor magnet 21a flows to the sensor core 22. As a result, the magnetic flux density detected by the magnetic sensor 23 becomes large.

The solenoid unit 10b is configured similarly to the solenoid unit 10a, and therefore the magnetic flux density passing through the magnetic sensor 23 becomes small when the two plungers 11a, 11b approach the sensor magnets 21a, 21b, and becomes large when the two plungers 11a, 11b move away from the sensor magnets 21a, 21b. When only one of the plungers 11a, 11b approaches the corresponding sensor magnets 21a, 21b, the magnetic flux density passing through the magnetic sensor 23 takes an intermediate value.

Hence, in the modified example shown in FIGS. 5A and 5B, the positions of the plungers 11a, 11b can be detected by detecting variation in the magnetic flux density using the magnetic sensor 23. Further, since the sensor magnets 21a, 21b are fixed to the XZ plane that is perpendicular to the movement direction of the plungers 11a, 11b, the possibility of damage to the sensor magnets 21a, 21b due to vibration generated when the plungers 11a, 11b move up and down can be reduced in comparison with a case where the sensor magnets 21a, 21b are fixed to the plungers 11a, 11b. As a result, the reliability of the electromagnetic actuator 1 is improved.

Embodiment 3

Figure 6A:
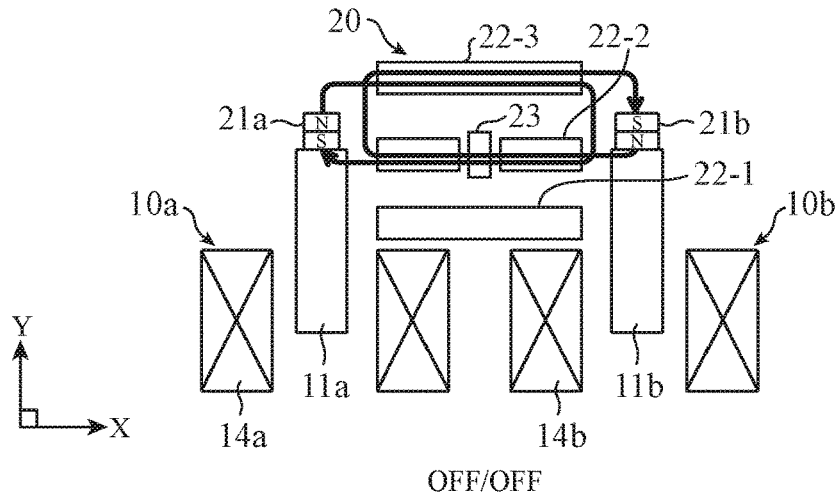
FIGS. 6A to 6C are plan views showing an example configuration of a position detection unit of an electromagnetic actuator according to Embodiment 3 of the invention.
Figure 6B:
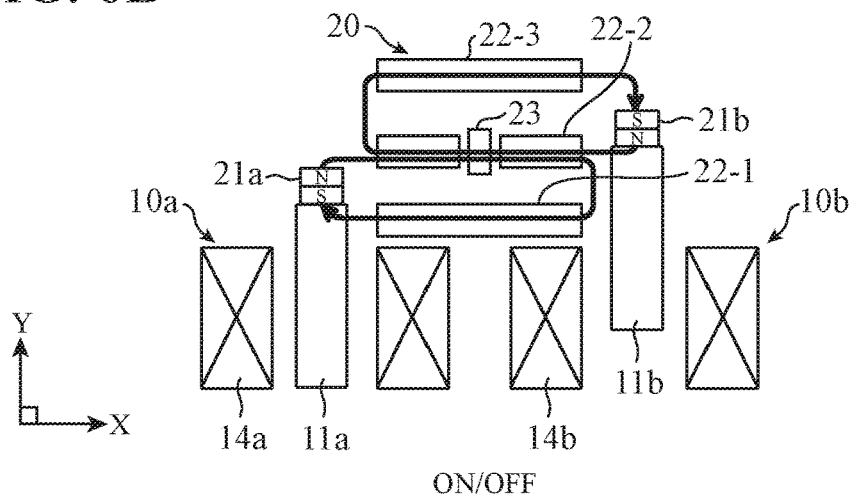
Figure 6C:
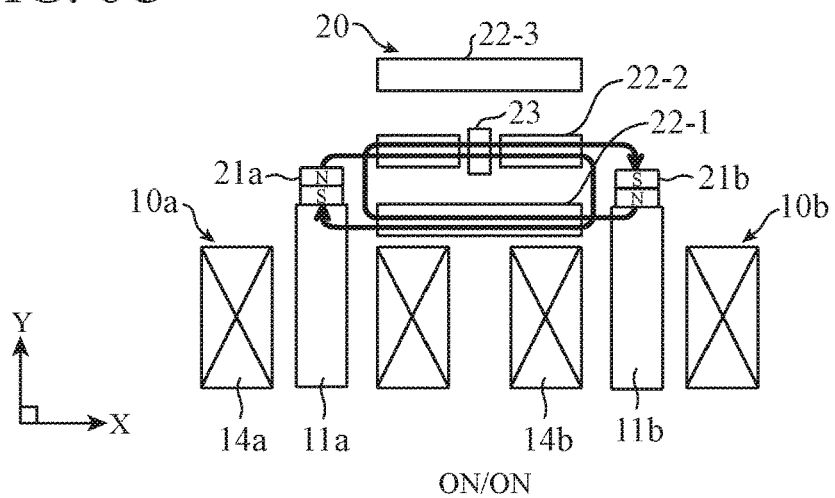

FIGS. 6A to 6C are front views showing an example configuration of a position detection unit 20 of an electromagnetic actuator 1 according to Embodiment 3 of the invention. Parts of the electromagnetic actuator 1 according to Embodiment 3 that are omitted from FIGS. 6A to 6C are configured identically to the electromagnetic actuator 1 shown in FIGS. 1A and 1B, and therefore FIGS. 1A and 1B should be referred to for these parts.

The position detection unit 20 according to Embodiment 3 includes three sensor cores 22-1, 22-2, 22-3 disposed on the XY plane that is parallel to the movement direction of the plungers 11a, 11b. Further, the sensor cores 22-1, 22-2, 22-3 are disposed to be aligned in the movement direction of the plungers 11a, 11b on the XY plane.

The sensor core 22-1 is a first sensor core, the sensor core 22-2 is a second sensor core, and the sensor core 22-3 is a third sensor core.

The sensor magnets 21a, 21b are disposed on the respective upper end faces of the plungers 11a, 11b so as to generate magnetic flux in mutually opposite directions. The magnetic fluxes from the sensor magnets 21a, 21b flowing through the sensor cores 22-1, 22-2, 22-3 are oriented as shown by arrows in FIGS. 6A, 6B, and 6C. Through the sensor core 22-2, the magnetic fluxes of the sensor magnets 21a, 21b can flow in common.

In Embodiment 3, the magnetic sensor 23 that is capable of detecting the density of the magnetic flux and the orientation of the magnetic flux is used. The magnetic sensor 23 is disposed in the sensor core 22-2 and detects the density and orientation of the magnetic flux flowing through the sensor core 22-2. It is assumed hereafter that the magnetic sensor 23 detects a magnetic flux density flowing through the sensor core 22-2 leftward on the paper surface of FIGS. 6A to 6C as a positive value, and detects a magnetic flux density flowing rightward on the paper surface of FIGS. 6A to 6C as a negative value.

Figure 7:
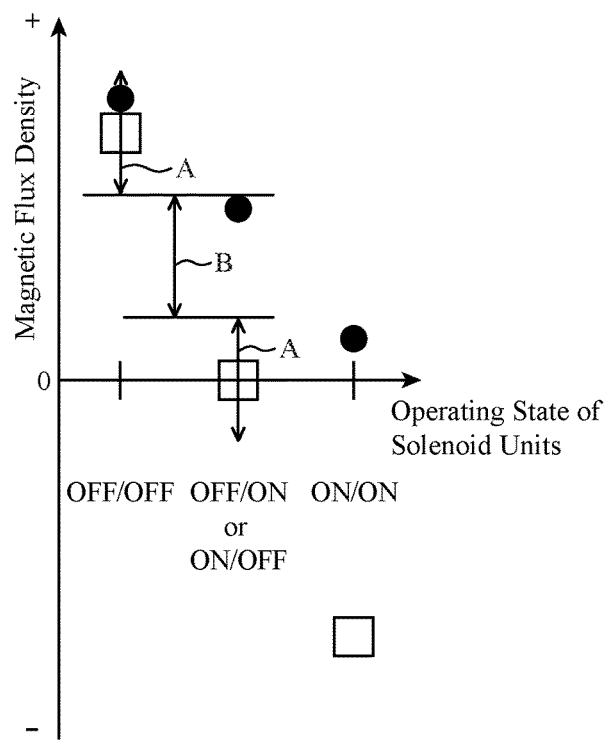
FIG. 7 is a graph schematically illustrating a relationship between operating states of two solenoid units and a magnetic flux density detected by a magnetic sensor in the electromagnetic actuator according to Embodiment 3.

FIG. 7 is a graph schematically illustrating a relationship between the operating states of the solenoid units 10a, 10b and the magnetic flux density detected by the magnetic sensor 23. On the graph, magnetic flux densities detected by the magnetic sensor 23 in the configuration shown in FIGS. 6A to 6C are indicated by squares, respectively. Further, for comparison, magnetic flux densities detected by the magnetic sensor 23 in the configuration of Embodiment 1, shown in FIGS. 1A and 1B, are indicated by circles, respectively.

As shown in FIG. 6A, when the solenoid units 10a, 10b are both in the OFF states, the two plungers 11a, 11b receive the biasing force of the respective springs 12a, 12b so as to move toward the upper side in the Y axis direction. At this time, the sensor magnets 21a, 21b are near the sensor core 22-3 on the upper side in the Y axis direction such that the magnetic fluxes flow leftward on the paper surface through the sensor core 22-2 in which the magnetic sensor 23 is disposed, and as a result, the magnetic fluxes are reinforced to each other. Accordingly, the magnetic flux density detected by the magnetic sensor 23 takes a positive value.

As shown in FIG. 6C, when the solenoid units 10a, 10b are both in the ON states, the two plungers 11a, 11b receive the electromagnetic force of the stators so as to move toward the lower side in the Y axis direction. At this time, the sensor magnets 21a, 21b are near the sensor core 22-1 on the lower side in the Y axis direction such that the magnetic fluxes flow rightward on the paper surface through the sensor core 22-2 in which the magnetic sensor 23 is disposed, and as a result, the magnetic fluxes are reinforced to each other. Accordingly, the magnetic flux density detected by the magnetic sensor 23 takes a negative value.

As shown in FIG. 6B, when one of the solenoid units 10a, 10b is in the ON state and the other is in the OFF state, one of the plungers 11a, 11b moves toward the upper side in the Y axis direction, and the other moves toward the lower side in the Y axis direction. At this time, one of the sensor magnets 21a, 21b is near the sensor core 22-3 on the upper side in the Y axis direction, and the other is near the sensor core 22-1 on the lower side in the Y axis direction. Accordingly, a magnetic flux oriented rightward on the paper surface and a magnetic flux oriented leftward on the paper surface flow through the sensor core 22-2 in which the magnetic sensor 23 is disposed such that the magnetic fluxes are canceled out to each other. As a result, the magnetic flux density detected by the magnetic sensor 23 takes an intermediate value, namely, a value of zero.

As described above, by detecting variation in the density and the orientation of the magnetic flux flowing through the sensor core 22-2 with the magnetic sensor 23, the positions of the plungers 11a, 11b can be detected.

With the configuration shown in FIGS. 6A to 6C, it is possible to reverse the orientation of the magnetic flux flowing through the magnetic sensor 23 between the case where the solenoid units 10a, 10b are ON states and the case where the solenoid units 10a, 10b are OFF states. As a result, the variation in the magnetic flux density in accordance with the positions of the plungers 11a, 11b can be increased in comparison with the configuration shown in FIGS. 1A and 1B. Therefore, even when the magnetic flux generated during coil energization flows to the sensor core 22-2, the influence of the magnetic flux generated during coil energization can be reduced.

As shown in the graph in FIG. 7, when the magnetic flux density flowing through the sensor core 22-2 is influenced by the magnetic flux generated during coil energization, variation may occur in the magnetic flux density within the range indicated by the arrow A. However, even when the magnetic flux generated during coil energization has such an influence, a magnetic flux density difference indicated by the arrow B occurs between the (OFF/OFF) and the (OFF/ON), and therefore tolerance to the magnetic flux generated during coil energization is improved.

In the case explained above, the sensor magnets 21a, 21b having identical magnetic force are used. However, sensor magnets 21a, 21b which are different in magnetic force may be used. By employing sensor magnets 21a, 21b which are different in magnetic force, it is possible to determine which of the solenoid units 10a, 10b is in the ON state.

Figure 8:
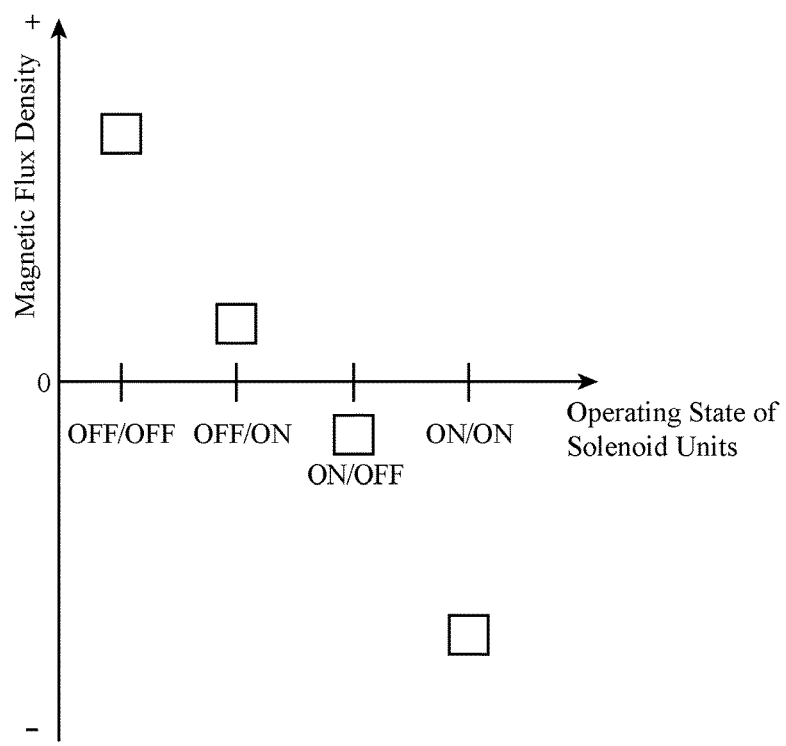
FIG. 8 is a graph schematically illustrating a relationship between operating states of two solenoid units and a magnetic flux density detected by a magnetic sensor when sensor magnets which are different in magnetic force are used in the electromagnetic actuator according to Embodiment 3.

Here, FIG. 8 is a graph schematically illustrating the relationship between the operating states of the two solenoid units 10a, 10b and the magnetic flux density detected by the magnetic sensor 23 when sensor magnets 21a, 21b which are different to each other in magnetic force are used in the electromagnetic actuator 1 according to Embodiment 3. For example, when the magnetic force of the sensor magnet 21a to the magnetic force of the sensor magnet 21b is 2:1 ratio, it is possible to differentiate between the (OFF/ON) operating state and the (ON/OFF) operating state of the solenoid units 10a, 10b. As a result, when only one of the solenoid units 10a, 10b is in the ON state, it is possible to determine the individual positions of the plungers 11a, 11b.

Although explanation thereof is omitted, also in Embodiments 1 and 2 described before, and in Embodiments 4 and 5 to be described later, using the sensor magnets 21a, 21b which are different in magnetic force, it is possible to differentiate between the (OFF/ON) operating state and the (ON/OFF) operating state of the solenoid units 10a, 10b.

Note that similarly to Embodiment 1 described before, when only one of the solenoid units 10a, 10b is in the ON state, it is possible to determine the individual positions of the plungers 11a, 11b by detecting which of the coils 14a, 14b is energized.

Further, the sensor core 22-1 shown in FIGS. 6A to 6C may be used as a part of the yoke 5 embedded in the case 4 of the electromagnetic actuator 1. When a part of the yoke 5 is formed by the sensor core 22-1, the sensor core 22-1 serves as a shortcut magnetic circuit through which the magnetic fluxes generated in the cores 13a, 13b during coil energization flow. Meanwhile, the sensor core 22-2 and the magnetic sensor 23 are disposed outside the shortcut magnetic circuit, and therefore the influence of the magnetic flux generated during coil energization can be reduced.

Furthermore, the sensor core 22-3 shown in FIGS. 6A to 6C may be used as a part of the yoke 5. In this case, respective end portions of the sensor core 22-3 shown in FIGS. 6A to 6C are magnetically connected to the coils 14a, 14b in a similar manner to respective end portions of the sensor core 22-2 shown in FIGS. 9A to 9C, to be described later, thereby forming a shortcut magnetic circuit through which the magnetic flux generated during coil energization flows. Also in this configuration, the sensor core 22-2 and the magnetic sensor 23 are disposed outside the shortcut magnetic circuit, and therefore the influence of the magnetic flux generated during coil energization can be reduced.

Embodiment 4

Figure 9A:
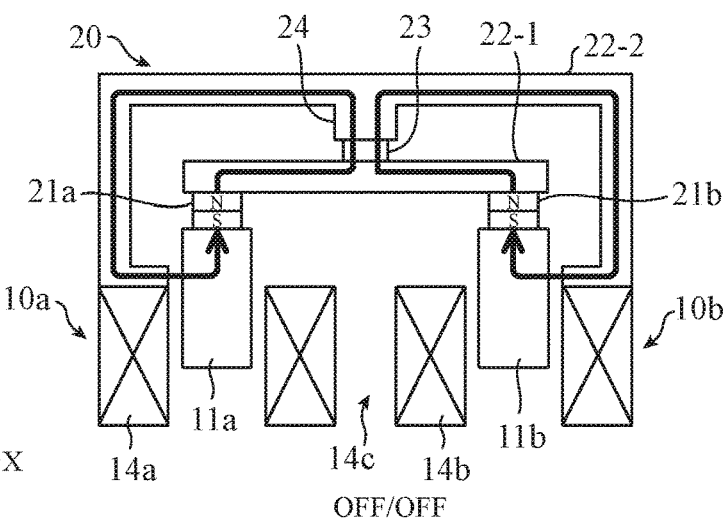
FIGS. 9A to 9C are front views showing an example configuration of a position detection unit of an electromagnetic actuator according to Embodiment 4 of the invention.
Figure 9B:
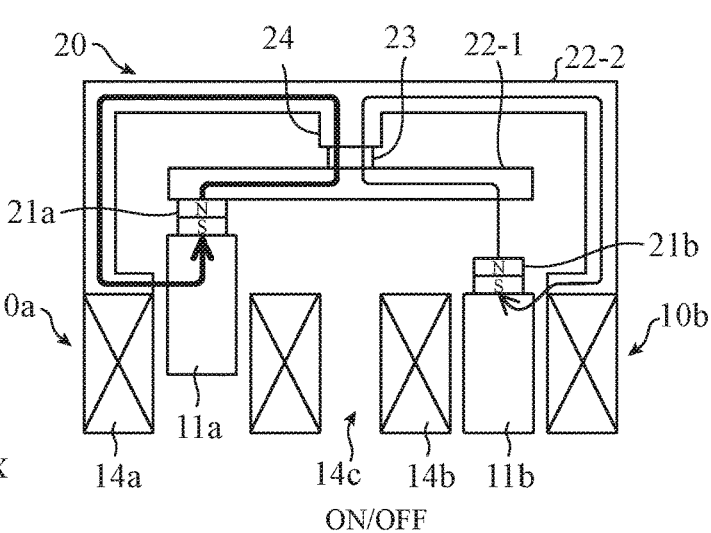
Figure 9C:
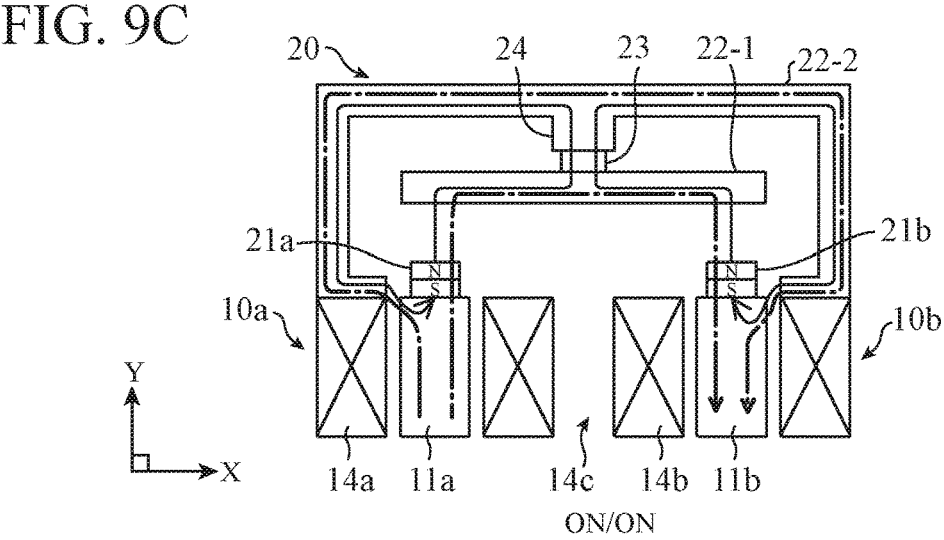

FIGS. 9A to 9C are front views showing an example configuration of a position detection unit 20 of an electromagnetic actuator 1 according to Embodiment 4 of the invention. Parts of the electromagnetic actuator 1 according to Embodiment 4 that are omitted from FIGS. 9A to 9C are configured identically to the electromagnetic actuator 1 shown in FIGS. 1A and 1B, and therefore FIGS. 1A and 1B should be referred to for these parts.

The position detection unit 20 according to Embodiment 4 includes two sensor cores 22-1, 22-2 disposed parallel to each other on the XY plane that is parallel to the movement direction of the plungers 11a, 11b. The sensor core 22-1 is disposed in a position opposing the sensor magnets 21a, 21b fixed respectively to the plungers 11a, 11b. The sensor core 22-1 serves as a shortcut magnetic circuit through which the magnetic flux generated in the cores 13a, 13b during coil energization flows.

The sensor core 22-2 is disposed on the upper side of the sensor core 22-1. The respective end portions of the sensor core 22-2 are formed to be a downward curved shape, and respective ends thereof are magnetically connected to the coils 14a, 14b. Accordingly, the sensor core 22-2 serves as a shortcut magnetic circuit through which the magnetic flux generated in the cores 13a, 13b during coil energization flows.

Further, a projecting portion 24 that projects downward from the sensor core 22-2 is formed, and the magnetic sensor 23 is disposed thereon. The projecting portion 24 serves as a path through which the magnetic fluxes of the sensor magnets 21a, 21b can flow in common.

The part in which the magnetic sensor 23 is disposed is an air gap between the projecting portion 24 and the sensor core 22-1 so that the magnetic resistance thereof is large. Therefore, the magnetic flux generated during coil energization mainly flows through the sensor core 22-1 and the sensor core 22-2, respectively, where the air gap does not exist. These magnetic fluxes are indicated by dot-dash line arrows in FIG. 9C.

Meanwhile, by providing an air gap portion 14c between the coil 14a and the coil 14b, the magnetic resistance is increased such that the magnetic fluxes of the sensor magnets 21a, 21b flow from the lower side sensor core 22-1 to the upper side sensor core 22-2 through the projecting portion 24. These magnetic fluxes are indicated by solid line arrows in FIGS. 9A, 9B, and 9C. Differences in the thicknesses of these solid line arrows represent differences in the magnitude of the magnetic flux density.

In the example shown in FIGS. 9A to 9C, the projecting portion 24 projecting downwardly is formed on the lower side of the upper side sensor core 22-2, and the magnetic sensor 23 is disposed in the air gap part where the projecting portion 24 and the lower side sensor core 22-1 oppose each other. Conversely, a projecting portion may be formed on the upper side of the lower side sensor core 22-1 to project upward therefrom, and the magnetic sensor 23 may be disposed thereon.

As shown in FIG. 9A, when the solenoid units 10a, 10b are both in the OFF states so that the plungers 11a, 11b are both positioned on the upper side in the Y axis direction, the respective air gaps between the sensor magnets 21a, 21b and the sensor core 22-1 are small, and therefore the magnetic resistance is small. Accordingly, the magnetic flux density passing through the magnetic sensor 23 is large.

As shown in FIG. 9C, when the solenoid units 10a, 10b are both in the ON states so that the plungers 11a, 11b are both positioned on the lower side in the Y axis direction, the respective air gaps between the sensor magnets 21a, 21b and the sensor core 22-1 are large, and therefore the magnetic resistance is large. Accordingly, the magnetic flux density passing through the magnetic sensor 23 is small.

As shown in FIG. 9B, when one of the solenoid units 10a, 10b is in the ON state and the other is in the OFF state so that one of the plungers 11a, 11b is positioned on the lower side in the Y axis direction and the other is positioned on the upper side in the Y axis direction, the magnetic resistance takes an intermediate value, and therefore the magnetic flux density passing through the magnetic sensor 23 also takes an intermediate value.

In this configuration, the positions of the plungers 11a, 11b can be detected by detecting variation in the magnetic flux density flowing through the projecting portion 24 with the magnetic sensor 23.

Further, also in Embodiment 4, similarly to Embodiment 1 described before, when only one of the solenoid units 10a, 10b is in the ON state, the individual positions of the plungers 11a, 11b can be determined by detecting which of the coils 14a, 14b is energized.

Embodiment 5

Figure 10A:
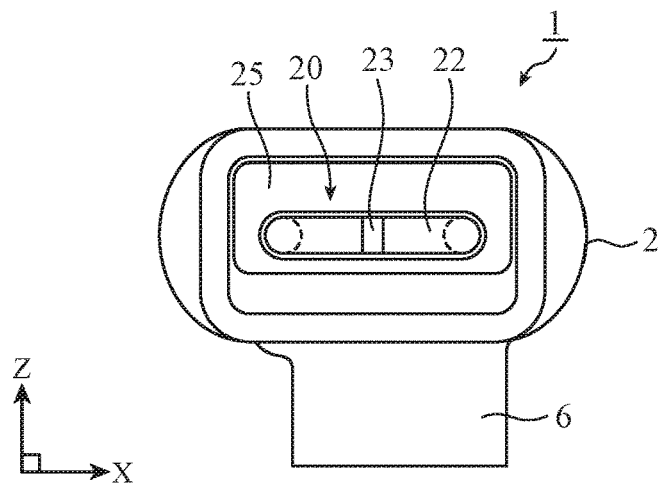
FIGS. 10A and 10B show an example configuration of an electromagnetic actuator according to Embodiment 5 of the invention, FIG. 10A being a plan view and FIG. 10B being a sectional view.
Figure 10B:
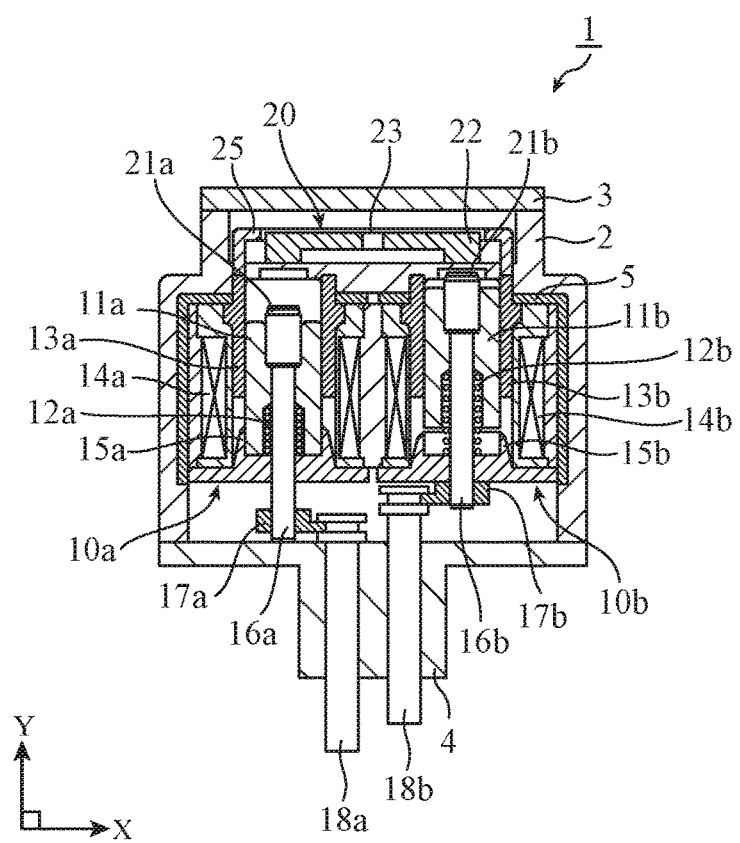

FIGS. 10A and 10B show an example configuration of an electromagnetic actuator 1 according to Embodiment 5 of the invention. FIG. 10A is a plan view and FIG. 10B is a sectional view. In FIG. 10A, the case 3 is removed such that a shielding member 25 is exposed. In FIGS. 10A and 10B, for the parts same or corresponding to those shown in FIGS. 1A and 1B, same reference numerals to those in FIGS. 1A and 1B are allocated, and descriptions of the parts are omitted.

The electromagnetic actuator 1 according to Embodiment 5 has a configuration formed by adding a shielding member 25 for blocking a magnetic flux flowing from the cores 13a, 13b to the magnetic sensor 23 to the configuration of the electromagnetic actuator 1 according to Embodiment 1, shown in FIGS. 1A and 1B. The shielding member 25 is connected to the magnetic circuits of the solenoid units 10a, 10b, and a magnetic flux generated during coil energization flows through the shielding member 25. As a result, the shielding member 25 shields the magnetic circuit of the position detection unit 20 having the sensor magnets 21a, 21b as magnetomotive force sources. Accordingly, the magnetic flux generated during coil energization does not flow to the sensor core 22 in which the magnetic sensor 23 is disposed, and as a result, an influence of a magnetic flux other than the magnetic flux of the sensor magnets 21a, 21b can be reduced.

Note that the shape of the shielding member 25 shown in FIGS. 10A and 10B is merely an example, and any shape capable of blocking magnetic flux other than the magnetic flux of the sensor magnets 21a, 21b, such as the magnetic flux generated during coil energization, may be employed. The shielding member may be provided similarly in the electromagnetic actuators 1 according to Embodiments 2 to 4 described before.

The influence of magnetic flux other than the magnetic flux of the sensor magnets 21a, 21b can also be reduced by making the areas of the opposing surfaces of the sensor core 22 opposing the respective sensor magnets 21a, 21b, or in other words magnetic path sectional areas of the sensor core 22, smaller than the areas of opposing surfaces of the sensor magnets 21a, 21b opposing the sensor core 22.

For example, in a case where the positional relationship between the cores 13a, 13b forming the magnetic circuits of the solenoid units 10a, 10b and the sensor core 22 are as shown in the example configuration of FIGS. 1A and 1B, if the areas of the opposing surfaces of the sensor core 22 opposing the respective sensor magnets 21a, 21b are large, the air gaps between the sensor core 22 and the cores 13a, 13b become narrower and the magnetic resistance is reduced, and as a result, the amount of the magnetic flux that leaks to the sensor core 22 during coil energization increases. On the other hand, by reducing the areas of the opposing surfaces of the sensor core 22 opposing the respective sensor magnets 21a, 21b, the influence of the magnetic flux leakage during coil energization can be reduced.

Further, by increasing the sectional area of the magnetic path forming the magnetic circuit of the position detection unit 20, the magnetic resistance of the magnetic path is reduced so that the magnetic flux density passing through the magnetic sensor 23 is increased, and as a result, it is possible to reduce influence from outside.

Figure 11:
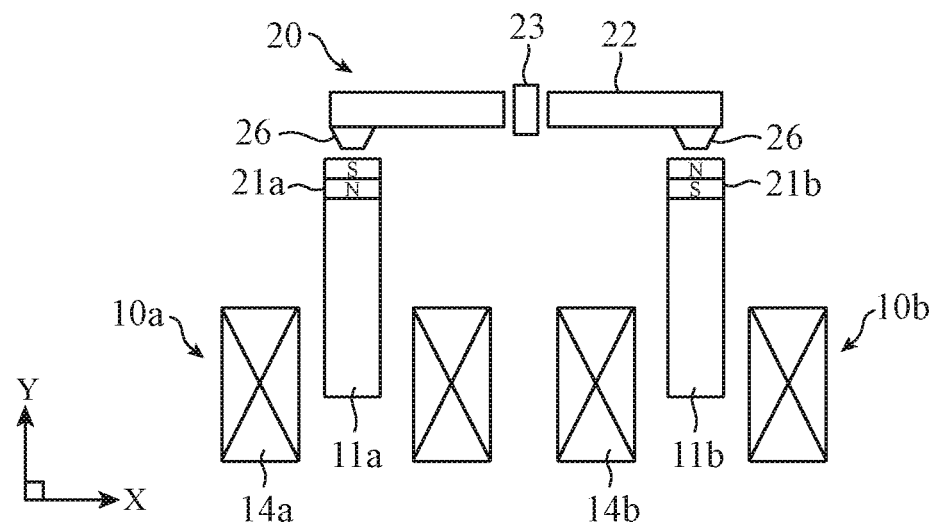
FIG. 11 is a plan view showing an example configuration of a position detection unit of the electromagnetic actuator according to Embodiment 5.

Here, FIG. 11 shows an example configuration of a position detection unit 20 of an electromagnetic actuator 1 according to Embodiment 5. In the example shown in FIG. 11, a tapered portion 26 shaped to taper toward the sensor magnet 21a is formed on the opposing surface at which the sensor core 22 opposes the sensor magnet 21a. A similar tapered portion 26 is formed on the opposing surface at which the sensor core 22 opposes the sensor magnet 21b. As a result, the influence of a magnetic flux other than the magnetic flux of the sensor magnets 21a, 21b can be reduced while suppressing the influence of the increase in magnetic resistance caused by a reduction in the magnetic path sectional area of the sensor core 22.

Note that the shape of the opposing surfaces at which the sensor core 22 opposes the respective sensor magnets 21a, 21b in FIG. 11 is merely an example, and any shape for making the areas of the opposing surfaces of the sensor core 22 smaller than the areas of the opposing surfaces of the sensor magnets 21a, 21b may be employed.

Figure 12:
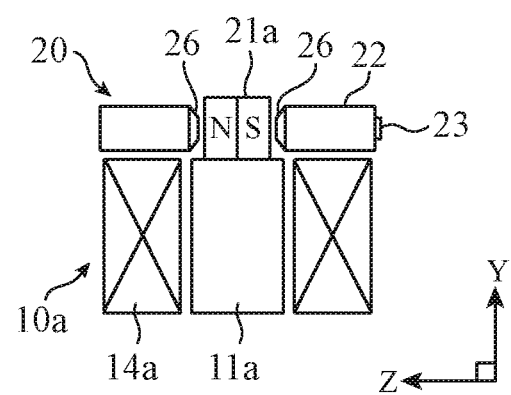
FIG. 12 is a plan view showing a modified example of the position detection unit of the electromagnetic actuator according to Embodiment 5.

Further, the tapered portions 26 may also be formed on the sensor core in the electromagnetic actuators 1 according to any of Embodiments 2 to 4, described before. FIG. 12 is a front view showing an example in which the tapered portions 26 are formed on the sensor core 22 according to Embodiment 2.

Each of the electromagnetic actuators 1 according to Embodiments 1 to 5 described above has a configuration in which the two solenoid units 10a, 10b are included, and the positions of the two plungers 11a, 11b are detected using a single magnetic sensor 23. However, a configuration in which three or more solenoid units are provided, and the positions of three or more plungers are detected using a single magnetic sensor may be adopted. For example, for detecting the positions of three plungers, the three plungers are disposed respectively on the three vertices of a triangle, three sensor magnets are disposed correspondingly to the three plungers, respectively, three sensor cores are disposed respectively on the three sides of the triangle, and the magnetic flux flowing through the three sensor cores, which varies in accordance with the positions of the three plungers, is detected by a single magnetic sensor. Alternatively, two magnetic sensors may be disposed in an electromagnetic actuator having three solenoid units. Namely, it is possible to form a configuration to detect operations of solenoid units using a smaller number of magnetic sensors than the number of solenoid units.

Besides the configurations described above, the respective embodiments of the invention can be combined freely to each other, and any of the constituent elements of the respective embodiments can be deformed or omitted within the scope of the invention.

INDUSTRIAL APPLICABILITY

The electromagnetic actuator according to the present invention is configured to detect the positions of a plurality of plungers, and is therefore suitable for use in an internal combustion engine as an electromagnetic actuator that switches a camshaft between high cam and low cam in order to adjust a lift amount of an intake valve or an exhaust valve or the like.

REFERENCE SIGNS LIST

1 Electromagnetic actuator
2 to 4 Case
5 Yoke
6 Connector
10a, 10b Solenoid unit
11a, 11b Plunger
12a, 12b Spring
13a, 13b Core
14a, 14b Coil
14c Air gap portion
15a, 15b Boss
16a, 16b Pin
17a, 17b Link
18a, 18b Shaft
20 Position detection unit
21a, 21b Sensor magnet
22, 22-1, 22-2, 22-3 Sensor core
22a, 22b Air gap portion
22A, 22B Divided core
23 Magnetic sensor
24 Projecting portion
25 Shielding member
26 Tapered portion

The invention claimed is:

1. An electromagnetic actuator comprising a plurality of sets, each of the sets including:
a plunger made of a magnetic material;
a spring biasing the plunger in one direction;

a core made of a magnetic material; and a coil generating, in the core, a magnetic flux to move the plunger in an opposite direction to the one direction, wherein the electromagnetic actuator further comprises:

a plurality of sensor magnets disposed correspondingly to a plurality of plungers, respectively, each of the plurality of plungers being the plunger in each of the plurality of sets;

a sensor core made of a magnetic material and disposed in a position through which a magnetic flux from the plurality of sensor magnets can flow; and a magnetic sensor that is disposed in a part of the sensor core through which respective magnetic fluxes of the plurality of sensor magnets can flow in common, and that detects a magnetic flux, which varies in accordance with respective movement positions of the plurality of plungers.

2. The electromagnetic actuator according to claim 1, wherein the sensor core and the magnetic sensor are disposed to be aligned on a plane that is perpendicular to a movement direction of the plurality of plungers.

3. The electromagnetic actuator according to claim 2, wherein the plurality of sensor magnets are fixed to the plurality of plungers so as to move integrally with the plurality of plungers, respectively.

4. The electromagnetic actuator according to claim 2, wherein the plurality of sensor magnets are fixed on the plane that is perpendicular to the movement direction of the plurality of plungers.

5. The electromagnetic actuator according to claim 4, wherein the plurality of sensor magnets are fixed in positions on the plane that is perpendicular to the movement direction of the plurality of plungers, where a magnetic flux of a sensor magnet among the plurality of sensor magnets flows to the plunger when said the plunger approaches the sensor core, and a magnetic flux of the sensor magnet flows to the sensor core when the plunger moves away from the sensor core.

6. The electromagnetic actuator according to claim 1, wherein the sensor core and the magnetic sensor are disposed to be aligned on a plane that is parallel to a movement direction of the plurality of plungers.

7. The electromagnetic actuator according to claim 6, wherein the sensor core includes a first sensor core and a second sensor core which are disposed on the plane that is parallel to the movement direction of the plurality of plungers, the first sensor core forms a shortcut magnetic circuit through which a magnetic flux generated in the core flows, and the magnetic sensor is disposed outside the shortcut magnetic circuit.

8. The electromagnetic actuator according to claim 6, wherein the sensor core includes a first sensor core, a second sensor core, and a third sensor core disposed to be aligned in the movement direction of the plurality of plungers on the plane that is parallel to the movement direction of the plurality of plungers, and the magnetic sensor is disposed in the second sensor core, which is disposed between the first sensor core and the third sensor core.

9. The electromagnetic actuator according to claim 8, further comprising a yoke made of a magnetic material, through which a magnetic flux generated by the core flows, wherein at least one of the first sensor core and the third sensor core forms a part of the yoke.

10. The electromagnetic actuator according to claim 1, wherein the plurality of sensor magnets are different to each other in magnetic force.

11. The electromagnetic actuator according to claim 1, further comprising a shielding member blocking magnetic flux that flows from the core to the magnetic sensor.

12. The electromagnetic actuator according to claim 1, wherein the magnetic sensor detects a density and an orientation of a magnetic flux.

13. The electromagnetic actuator according to claim 1, wherein an area of an opposing surface of the sensor core, at which the sensor core opposes one of the plurality of sensor magnets, is smaller than an area of an opposing surface of one of the plurality of sensor magnets, at which the one of the plurality of sensor magnets opposes the sensor core.

14. The electromagnetic actuator according to claim 13, wherein a tapered portion shaped to taper toward the sensor magnet is formed on each of the opposing surfaces of the sensor core, at which the sensor core opposes the sensor magnets.

* * * * *